(12) United States Patent
Cole et al.

(10) Patent No.: US 10,876,800 B2
(45) Date of Patent: Dec. 29, 2020

(54) MECHANICAL SYSTEM WITH COOLING APPARATUS

(71) Applicant: ABB Schweiz AG, Baden (CH)

(72) Inventors: Gregory Cole, West Hartford, CT (US); Qimin Dong, Greer, SC (US); Stefan Rakuff, Windsor, CT (US); Joe J. Liou, Windsor, CT (US)

(73) Assignee: ABB Schweiz AG, Baden (CH)

( * ) Notice: Subject to any disclaimer, the term of this patent is extended or adjusted under 35 U.S.C. 154(b) by 24 days.

(21) Appl. No.: 16/033,992

(22) Filed: Jul. 12, 2018

(65) Prior Publication Data

US 2020/0018558 A1   Jan. 16, 2020

(51) Int. Cl.
| F28F 3/04 | (2006.01) |
| F16H 57/02 | (2012.01) |
| F16H 57/04 | (2010.01) |
| F04D 29/58 | (2006.01) |
| F04D 17/16 | (2006.01) |

(52) U.S. Cl.
CPC ............ *F28F 3/04* (2013.01); *F04D 29/5806* (2013.01); *F16H 57/02* (2013.01); *F16H 57/0416* (2013.01); *F04D 17/16* (2013.01)

(58) Field of Classification Search
CPC ............ F16H 57/0415; F16H 57/0416; F16H 57/0417; F16H 57/0498; F28D 1/024; F04D 29/5806; F04D 25/082; F04B 39/066

See application file for complete search history.

(56) References Cited

U.S. PATENT DOCUMENTS

| 1,564,742 | A | * | 12/1925 | Acker ................. F16H 57/0415 |
| | | | | 74/606 A |
| 1,991,618 | A | * | 2/1935 | Lyman .................. F01M 5/002 |
| | | | | 184/104.3 |

(Continued)

FOREIGN PATENT DOCUMENTS

| DE | 858920 C | * | 12/1952 | ............... F16H 1/16 |
| DE | 1298819 B | * | 7/1969 | ......... F16H 57/0412 |

(Continued)

OTHER PUBLICATIONS

EPO Translation of DE 1298819 B, Wolkenstein, Jul. 3, 1969. (Year: 2019).*

(Continued)

*Primary Examiner* — Daniel D Yabut
(74) *Attorney, Agent, or Firm* — Leydig, Voit & Mayer, Ltd.

(57) ABSTRACT

A mechanical drive system includes a mechanical drive component, an enclosure, and a centrifugal fan. The mechanical drive component has a housing and a rotatable shaft supported within the housing. The enclosure is disposed on the housing and a wall of the housing has an output opening therein through which the rotatable shaft of the mechanical drive component extends and another wall has an intake opening therein. Surfaces of the housing and the walls of the enclosure define an air passage channel extending from the intake opening to the output opening. The centrifugal fan is aligned and in fluid communication with the output opening of the enclosure. The impeller is operatively connected to the rotatable shaft.

18 Claims, 6 Drawing Sheets

(56) References Cited

U.S. PATENT DOCUMENTS

| | | | | |
|---|---|---|---|---|
| 2,147,391 | A * | 2/1939 | Acker | F16H 1/16 74/606 A |
| 3,353,591 | A * | 11/1967 | Zak | F16H 57/0416 165/47 |
| 3,921,603 | A | 11/1975 | Bentz et al. | |
| 4,633,938 | A * | 1/1987 | Schunck | F16H 57/0493 165/47 |
| 4,872,502 | A | 10/1989 | Holzman | |
| 4,949,524 | A | 8/1990 | Martin et al. | |
| 6,155,135 | A * | 12/2000 | Gage | F16H 57/0416 165/47 |
| 9,756,759 | B2 | 9/2017 | Kimura et al. | |
| 2008/0302880 | A1 * | 12/2008 | Eubank | F04D 25/082 237/28 |
| 2009/0038780 | A1 * | 2/2009 | Liu | F28F 1/16 165/104.28 |
| 2011/0179903 | A1 * | 7/2011 | Tietyen | F28D 1/024 74/606 A |
| 2012/0024097 | A1 * | 2/2012 | Strau | F16C 33/664 74/467 |
| 2016/0312877 | A1 * | 10/2016 | Becka | F16H 57/031 |
| 2018/0262094 | A1 * | 9/2018 | Blankemeier | H02K 9/06 |

FOREIGN PATENT DOCUMENTS

| | | | | |
|---|---|---|---|---|
| DE | | 3318199 A1 * | 11/1984 | B23Q 11/127 |
| WO | WO 2012/123043 A1 | | 9/2012 | |

OTHER PUBLICATIONS

EPO Translation of DE 3318199 A1, Fuchs, Nov. 22, 1984. (Year: 2019).*

Bauer et al., "Thermal analysis and optimization of gearboxes by simulation," *VDI-Berichte Nr. 2284*, pp. 917-927 (2017).

European Patent Office, Extended European Search Report in European Patent Application No. 19185529.5, 13 pp. (dated Sep. 6, 2019).

* cited by examiner

MECHANICAL SYSTEM WITH COOLING APPARATUS

TECHNICAL FIELD

The present disclosure relates generally to a mechanical system with a cooling apparatus and, more particularly, to a mechanical drive system with a centrifugal cooling system.

BACKGROUND

Mechanical systems such as mechanical drive systems are often used to drive components and systems in various industries such as material handling, mining, and food processing. Such mechanical drive systems may be used to modify, as desired, the speed, torque, and/or direction of rotational input power.

During the operation of a mechanical drive system, a significant amount of heat may be generated as a result of both speed dependent and load dependent sources or factors. For example, interengagement of the rotating shafts and components, friction within bearings, and friction caused by lubricating oil may all result in increases in the operating temperature within the housing of the system. Excessive heat generation and buildup may limit the operating parameters (e.g., load, of the mechanical system or reduce the life of the components of the system.

Various cooling strategies have been employed to dissipate heat generated during the operation of the mechanical systems. In some systems, passive convection cooling may be used. In other systems, the oil used to lubricate the internal components of the system may be cooled with an external cooling system. In still other systems, forced air convection cooling may be used.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a mechanical drive system includes a mechanical drive component, an enclosure, and a centrifugal fan. The mechanical drive component has a housing and a rotatable shaft supported within the housing. The housing has a first end surface, an opposite second end surface, a pair of spaced apart side surfaces extending between the first and second end surfaces, and an upper surface extending between the first and second end surfaces. The enclosure is disposed on the housing and has a first end wall, a second opposite end wall, a pair of spaced apart sidewalls extending between the first and second end walls, and an upper wall extending between the first and second end walls. One of the walls has an output opening therein through which the rotatable shaft of the mechanical drive component extends and another of the walls has an intake opening therein. The first and second end surfaces, the side surfaces, and the upper surface of the housing of the mechanical drive component and the walls of the enclosure define an air passage channel extending from the intake opening to the output opening. The centrifugal fan has a rotatable impeller aligned and in fluid communication with the output opening of the enclosure. The rotatable shaft is operatively connected to the impeller.

In another aspect, a mechanical system includes a mechanical component, an enclosure, and a centrifugal fan. The mechanical component has a housing and first and second rotatable shafts supported within the housing. The housing has a first end surface, an opposite second end surface, a pair of spaced apart side surfaces extending between the first and second end surfaces, and an upper surface extending between the first and second end surfaces. The first shaft is operatively connected to the second shaft and extends through the first end surface while the second shaft extends through the second end surface. Each of the side surfaces and the upper surface have a plurality of heat dissipation fins mounted thereon. The enclosure is disposed on and encloses the housing and has a first end wall, a second opposite end wall, a pair of spaced apart sidewalls extending between the first and second end walls, and an upper wall extending between the first and second end walls. The first end wall has an output opening therein through which the first shaft extends and the second end wall has an intake opening therein and through which the second shaft extends. The second end wall has a plurality of edges, with each edge being adjacent one of the sidewalls and the upper wall, and the intake opening is spaced from each edge of the second end wall. The first and second end surfaces, the side surfaces, and the upper surface of the housing of the mechanical drive component and the walls of the enclosure define an air passage channel extending from the intake opening to the output opening. The plurality of heat dissipation fins are disposed within the air passage channel. The centrifugal fan has a rotable impeller aligned and in fluid communication with the output opening of the enclosure. The first shaft is operatively connected to the impeller.

In still another aspect, a cooling system for a mechanical drive system includes an enclosure and a centrifugal fan. The mechanical drive system has a rotatable shaft and a housing. The enclosure is configured to be mounted on and enclose the housing and the enclosure has a first end wall, a second opposite end wall, a pair of spaced apart sidewalls extending between the first and second end walls, and an upper wall extending between the first and second end walls. One of the first and second end walls has an output opening therein configured to receive therethrough the rotatable shaft, and another of the first and second end walls having an intake opening therein. The centrifugal fan has a rotatable impeller aligned and in fluid communication with the output opening of the enclosure. The impeller is configured to be operatively connected to the rotatable shaft of the mechanical drive component.

DETAILED DESCRIPTION

Figure 1:
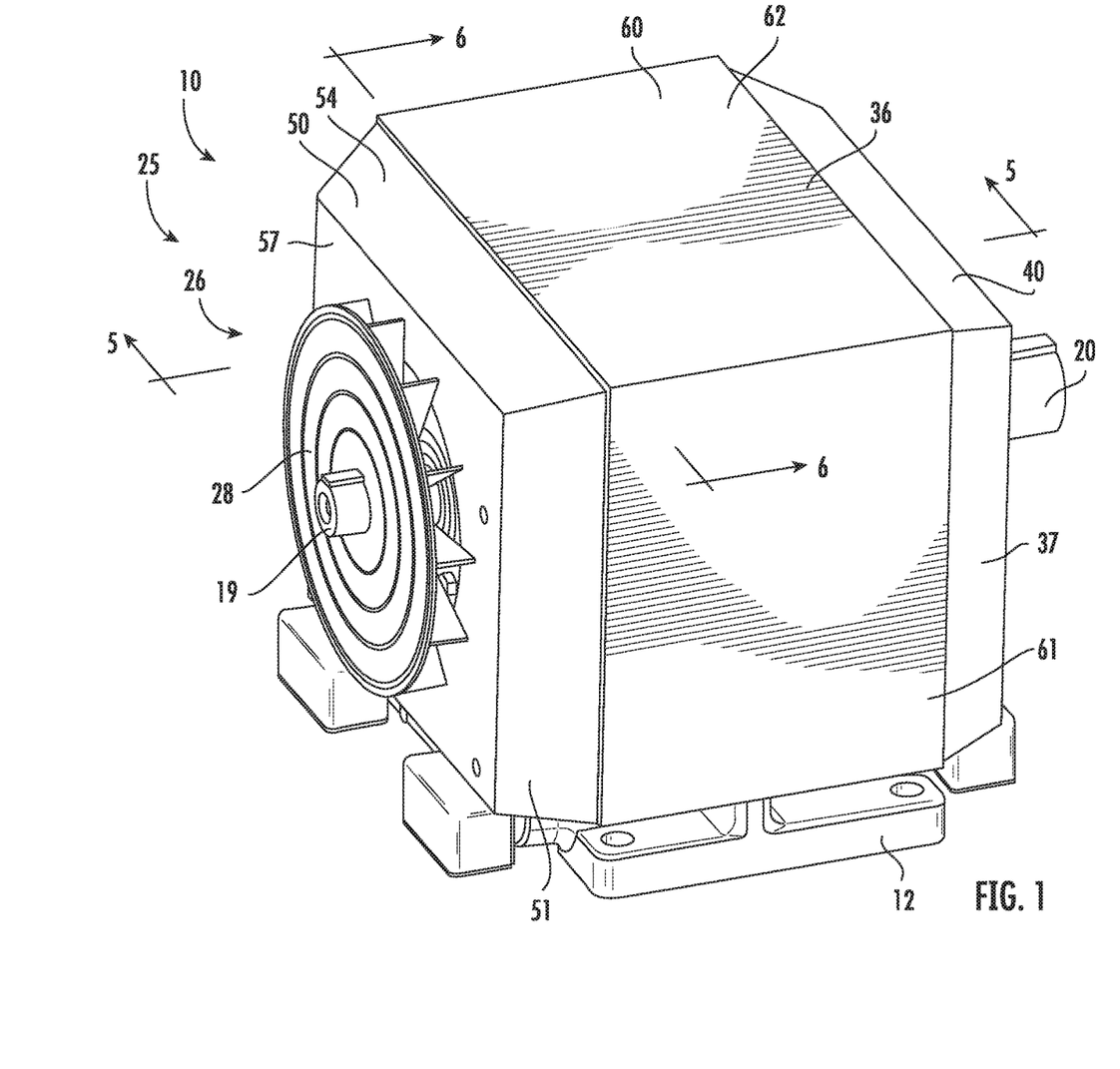
FIG. 1 is a perspective view of a mechanical drive system in accordance with the disclosure.
Figure 2:
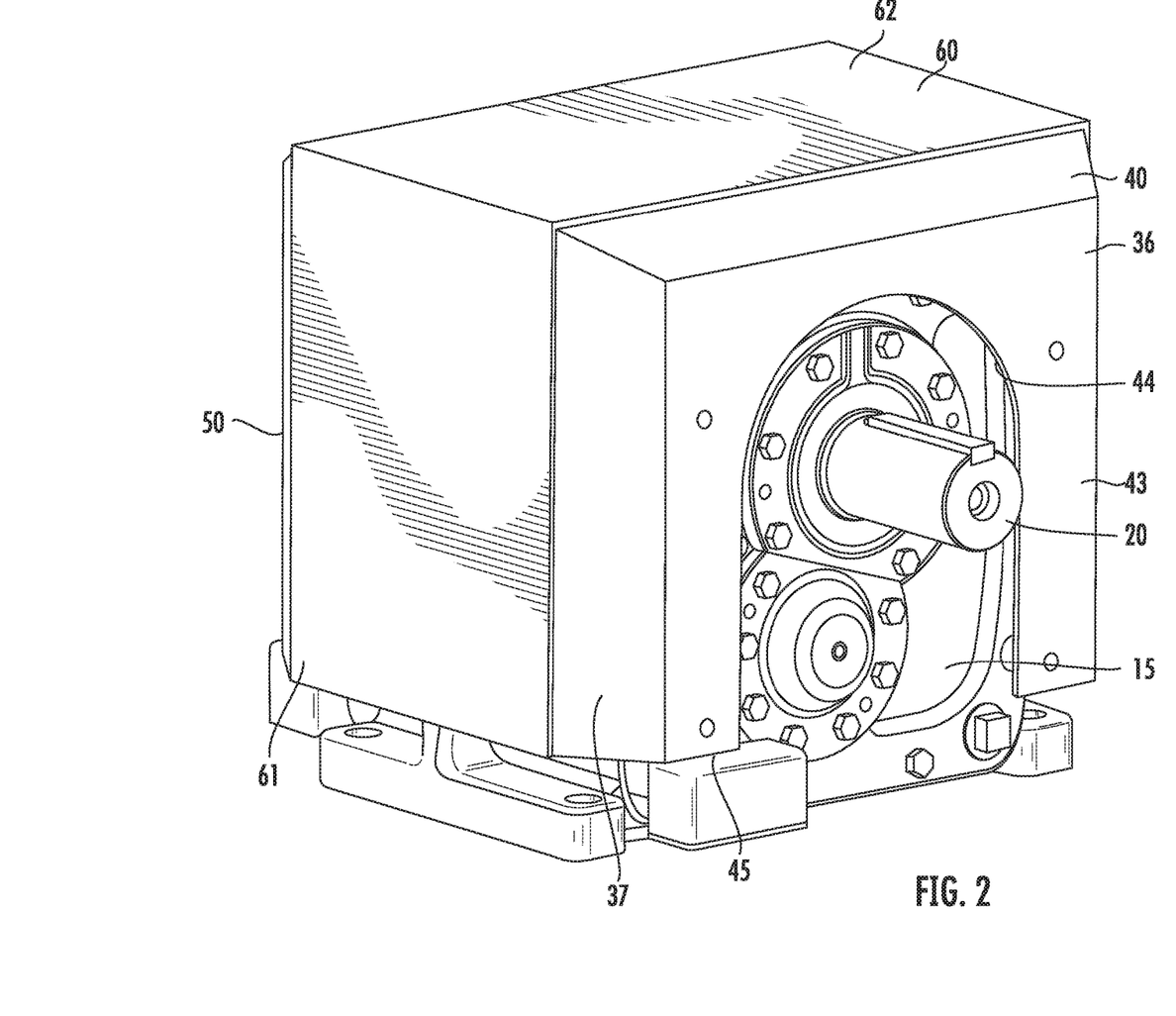
FIG. 2 is perspective view of the mechanical drive system of FIG. 1 but from a different perspective.
Figure 3:
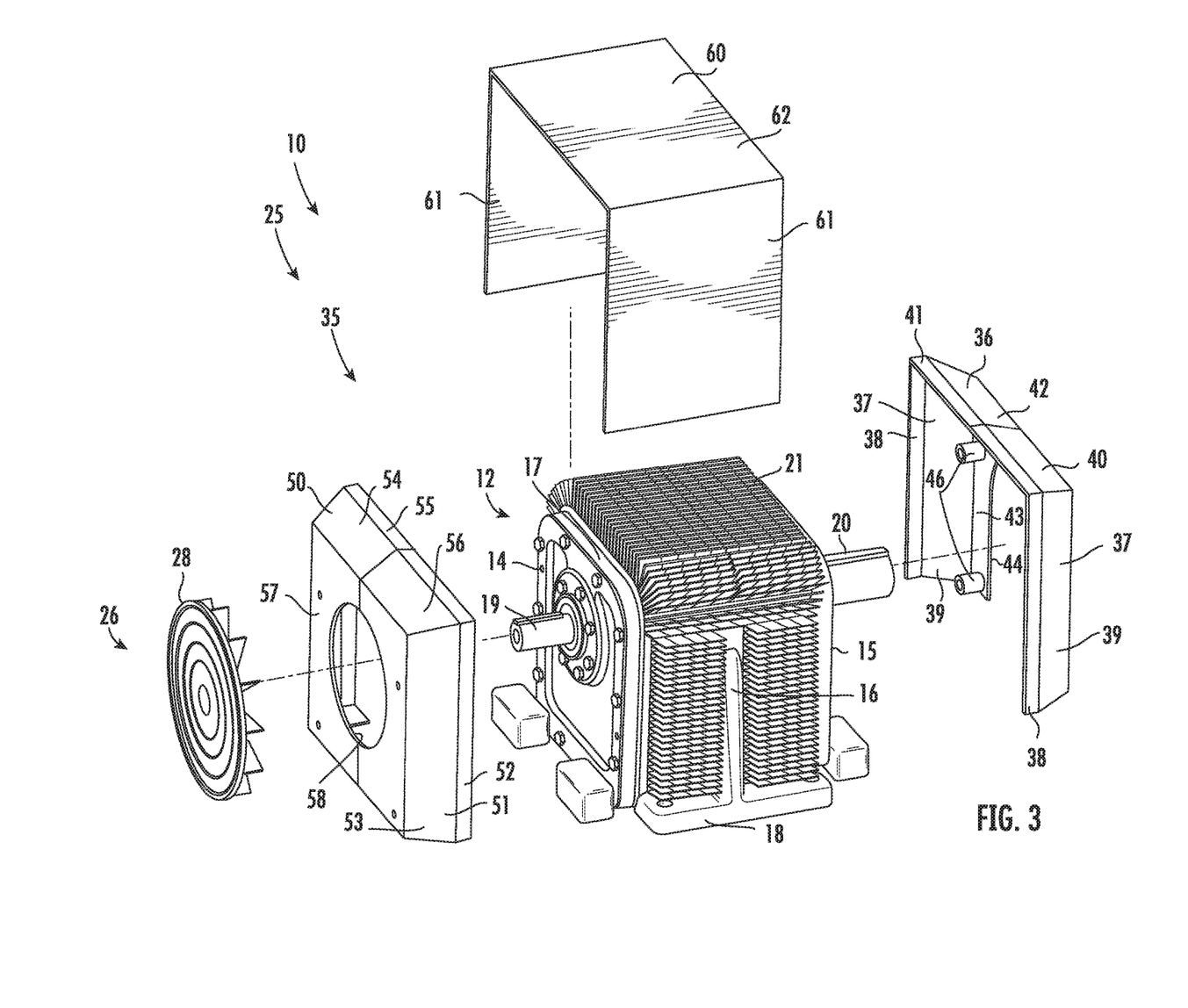
FIG. 3 is an exploded perspective view of the mechanical drive system of FIG. 1.
Figure 4:
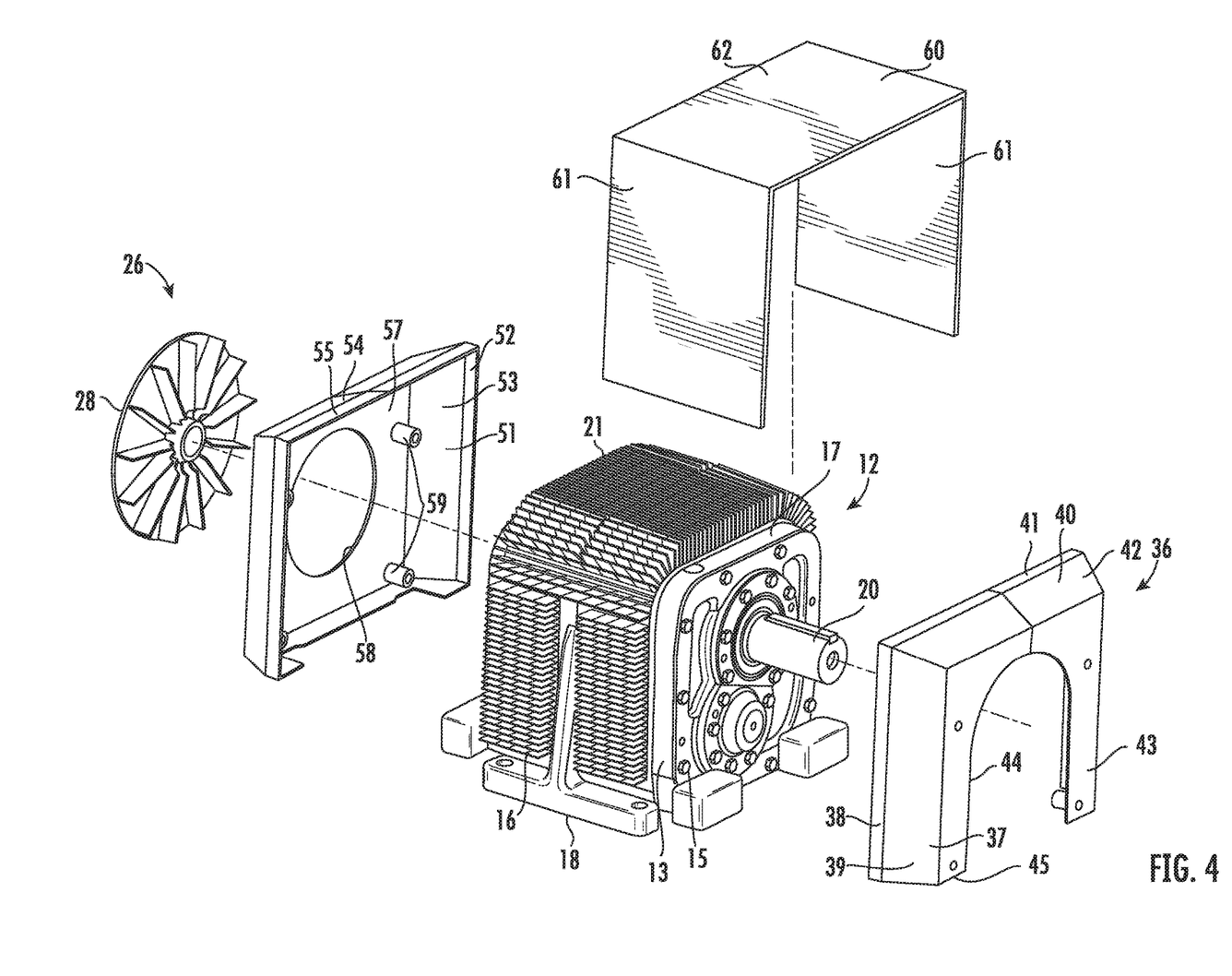
FIG. 4 is an exploded perspective view of the mechanical drive system of FIG. 1 but taken from the perspective of FIG. 2.

Referring to FIGS. 1-2, a mechanical drive system 10, in the form of a speed reducer 12, having an integral forced air cooling system 25 is depicted. Speed reducer 12 includes a generally rectangular cuboid housing 13 (FIG. 5) with a first end surface or face 14 and an opposite second end surface or face 15. Oppositely facing side surfaces 16, an upper surface 17, and a lower surface 18 extend between the first end surface 14 and the second end surface 15. An input shaft 19 extends through the first end surface 14 into the housing 13 and an output shaft 20 extends through the second end surface 15 into the housing. The input shaft 19 and the output shaft 20 are operatively connected through various gears (not shown) within the housing 13. The input shaft 19, the output shaft 20, and the gears within the housing 13 are rotatably supported by bearings (not shown). The housing 13 may include oil therein to lubricate and cool the components within the housing.

Housing 13 can, if desired, include a plurality of heat dissipation fins 21 disposed on a base plate 22, which is mounted on the surface of the housing. As depicted, the fins 21 are mounted on the side surfaces 16 and the upper surface 17 of the housing. The fins 21 can be secured to the housing 13 along any of the surfaces and in any desired manner.

The housing 13 may be formed of any desired material. In some instances, the housing may be formed of steel or cast iron. The fins can be formed of any desired material. In some instances, the fins 21 may be formed of a material that is different or dissimilar to the material from which the housing 13 is formed. In some instances, for example, the fins may be formed of a material having a high thermal conductivity such as aluminum, copper, alloys of such materials as well as any other material having similar or desired heat transfer and strength characteristics.

Cooling system 25 includes a centrifugal fan 26 and an enclosure 35. The centrifugal fan 26 may be configured as a fan or blower and may be operatively connected to or driven by the input shaft 19 of the speed reducer 12. The centrifugal fan 26 has a rotatable impeller 28. If desired, the centrifugal fan 26 may further include a housing (not shown) such as one that includes a circular inlet (not shown) along the central axis of the impeller 28 and an outlet (not shown) spaced radially from the central axis. In some instances, the fan 26 may be configured with straight blades so that the fan will operate as part of the cooling system 25 regardless of which direction the impeller 28 rotates. If the centrifugal fan is configured with a housing having an outlet, the outlet may be fluidly connected to duct work (not shown).

The enclosure 35 includes an intake shroud 36, an output shroud 50, and a cover 60 extending between the inlet shroud and the output shroud. The intake shroud 36 is generally U-shaped with a pair of spaced apart legs 37 interconnected by a connecting section 40 and partially enclosed by an intake wall or surface 43. Each of the legs 37 includes a flange portion 38 and an angled portion 39 extending between the flange portion and the intake wall 43. The connecting section 40 includes a flange portion 41 and an angled portion 42 extending between the connecting section and the intake wall 43.

The intake wall 43 includes an opening in the form of a slot 44 extending upward from the lower surface 45 of the intake wall. In other embodiments, the opening may take other forms such as, for example, being circular. A pair of mounting bosses 46 project inwardly (i.e., towards the housing 13 of speed reducer 12) from the intake wall 43 adjacent each of the legs 37. Fasteners (not shown) such as bolts extend through the bosses 46 and into the second end surface 15 of the housing 13 to secure the intake shroud 36 to the housing.

The output shroud 50 can be generally similar to the intake shroud 36. As such, the output shroud 50 is generally U-shaped with a pair of spaced apart legs 51 interconnected by a connecting section 54 and partially enclosed by an output wall or surface 57. Each of the legs 51 includes a flange portion 52 and an angled portion 53 extending between the flange portion and the intake wall 39. The connecting section 54 includes a flange portion 55 and an angled portion 56 extending between the connecting section and the output wall 57.

The output wall 57 includes an output opening 58 disposed adjacent the centrifugal fan 26 to permit air to be drawn by the fan from the output shroud 50. If the centrifugal fan 26 includes a housing, the output opening 58 of the output wall 57 may be configured to generally match the configuration (e.g., the diameter) of the circular inlet of the housing of the centrifugal fan to permit an airtight connection between the centrifugal fan and the output wall. The input shaft 19 extends through both the impeller 28 and the output opening 58 in the output wall 57. A pair of mounting bosses 59 project inwardly (i.e., towards the housing 13 of speed reducer 12) from the output wall 57 adjacent each of the legs 51. Fasteners (not shown) such as bolts extend through the bosses 59 and into the first end surface 14 of the housing 13 to secure the output shroud 50 to the housing.

Cover 60 is generally U-shaped with a pair of spaced apart sidewalls 61 interconnected by a horizontal upper wall 62. The cover 60 is dimensioned to be mounted in an airtight manner on the flange portions 38, 41 of the intake shroud 36 and the flange portions 52, 55 of the output shroud 50. Accordingly, the legs 61 may be approximately the same length or slightly longer than the flange portions 38 of the legs 37 of the intake shroud 36 and the flange portions 52 of the legs 51 of the output shroud 50. Similarly, horizontal connecting section 62 may be approximately the same length or slightly longer than the flange portion 41 of the connecting section 40 of the intake shroud 36 and the flange portion 55 of the connecting section 54 of the output shroud 50.

Figure 5:
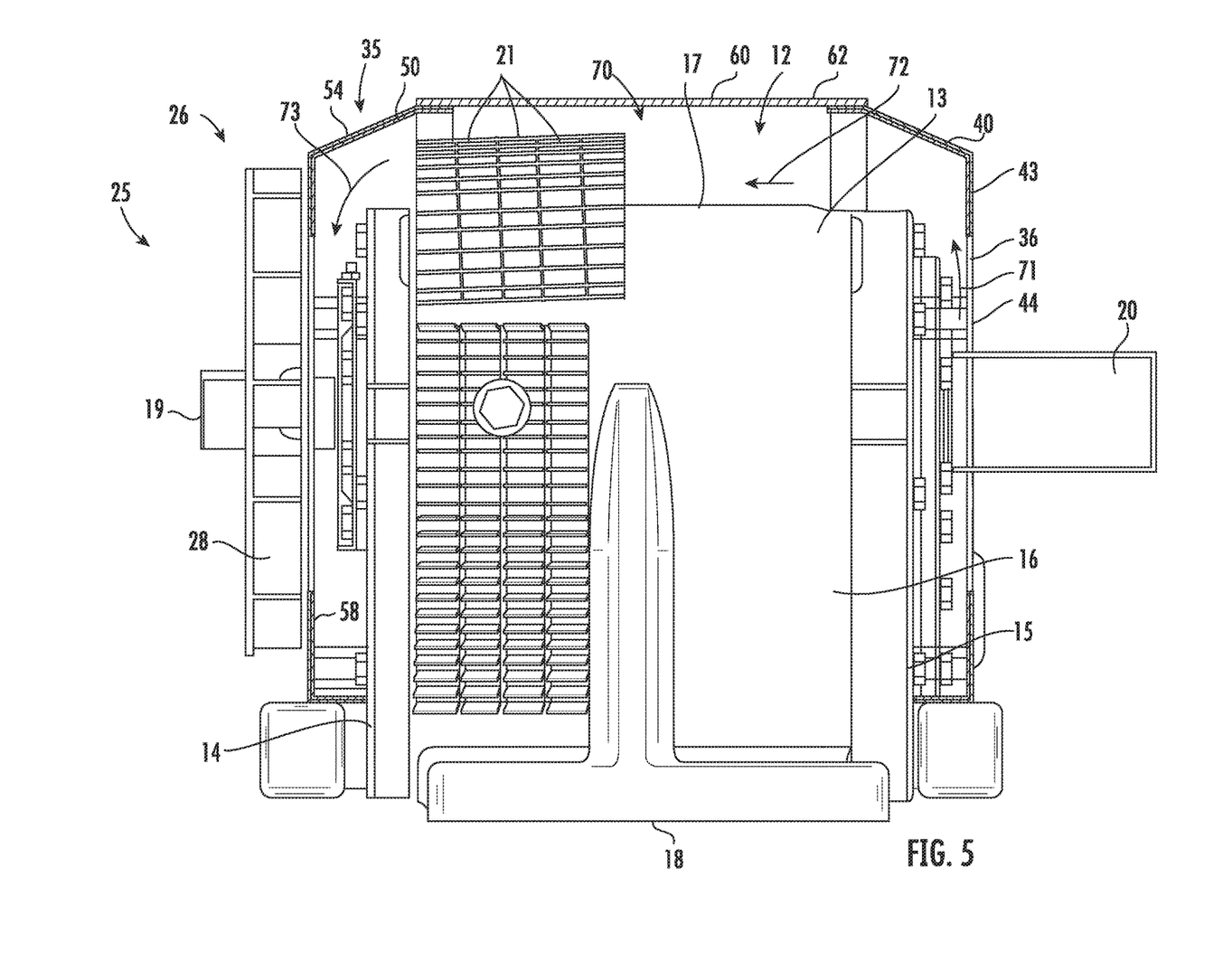
FIG. 5 is a side view with the enclosure in section generally along line 5-5 of FIG. 1 and with a portion of the heat dissipation fins removed for clarity.
Figure 6:
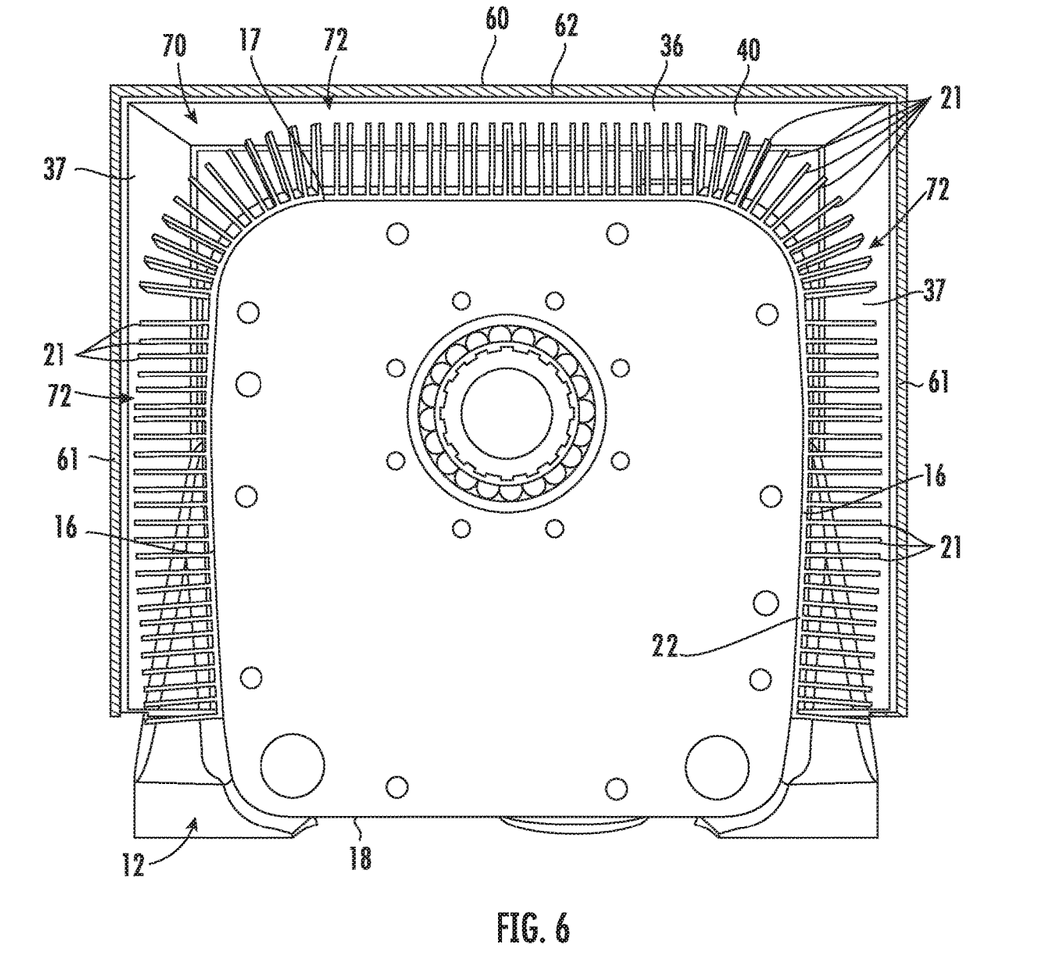
FIG. 6 is a sectional view taken generally along line 6-6 of FIG. 1.

Referring to FIGS. 5-6, the intake shroud 36, the output shroud 50, and the cover 60 are spaced from the housing 13 to define an air passage duct or air passage channel 70 that extends from the intake shroud to the centrifugal fan 26. More specifically, the air passage channel 70 includes a plurality of sections or segments from the intake shroud 36 to the output shroud 50. The slot 44 of the intake wall 43 defines the inlet or intake to the air passage channel 70. The first segment, depicted at 71, of the air passage channel 70 begins at the slot 44 of the intake wall 43 and extends to the side surfaces 16 and upper surface 17 of the housing 14. The first segment 71 is defined by the gap or space between the second end surface 15 of the housing 13 and the intake wall 43 of the intake shroud 36.

The second segment 72 of the air passage channel 70 continues between and along the length of the side surfaces 16 of the housing 13 and the sidewalls 61 of the cover 60 and between and along the upper surface 17 of the housing and the upper wall 62 of the cover. The third segment 73 of the air passage channel 70 extends from the second segment 72 towards the output opening and is defined by the gap or space between the first end surface 14 of the housing 13 and the output wall 57 of the output shroud. The second or outlet end of the air passage channel 70 is defined by the circular opening 58 in the outlet wall 57 of the output shroud 50. If the housing 13 includes fins 21 thereon, the fins extend or project within the gap or air passage channel 70 along the sections of the channel depicted at 72 and 73. As best seen in FIG. 6, the fins can extend entirely or essentially entirely across the air passage channel 70 so that the ends of the fins are positioned in close proximity to the cover 60. The distance between the housing 13 and the closure 35 may be reduced from that shown in the drawings if the housing does not include fins 21 thereon.

During assembly, the intake shroud 36 is mounted on the second end surface 15 of the housing 13 with fasteners (not shown) that extend through the bosses 46 in the intake shroud and into the housing 13. The output shroud 50 is mounted on the first end surface 14 of the housing 13 with fasteners (not shown) that extend through the bosses 59 in the output shroud and into the housing 13. The cover 60 is mounted so that it extends between the intake shroud 36 and the output shroud 50. In the depicted embodiment, the cover is disposed or mounted on the flange portions 38, 41 of the intake shroud 36 and the flange portions 52, 55 of the output flange 50 so that edges of the cover 60 overlap with and engage edges of the intake shroud 36 and the output shroud 50. The cover 60 may be secured to the housing 14 or to the intake shroud 36 and the output shroud 50 in any desired manner such as with fasteners (not shown).

Once assembled, the enclosure 35 encloses the housing 13 and encloses substantially the first end surface 14, the second end surface 15, the side surfaces 16, and the upper surface 17. As used herein, enclose substantially refers to the enclosure extending along the entire length or almost the entire length of each of the first end surface 14, the second end surface 15, the side surfaces 16, and the upper surface 17 of the housing.

During operation, a rotational input to input shaft 19 is provided to drive the input shaft and ultimately rotate the output shaft 20. The rotation of the input shaft 19 causes the rotation of the impeller 28 of the centrifugal fan 26. The rotation of the impeller 28 creates a negative pressure or vacuum adjacent the opening 58 in the output wall 57 of the output shroud so that air is drawn through the slot 44 in the intake wall 43 of the intake shroud 36 and into the air passage channel 70. As the air passes through the air passage channel 70, it passes over the housing 13 as well as the fins 21 to cool the speed reducer 12 before passing through the opening 58 in the output wall 57 of the output shroud 50.

Various alternative embodiments are contemplated. For example, although depicted as a speed reducer 12, the mechanical drive system 10 may have any configuration that includes a shaft to drive the centrifugal fan 26. Although the centrifugal fan 26 is operatively connected to or driven by the input shaft 19 of the speed reducer 12, in other mechanical drive systems 10, the centrifugal fan 26 may be operatively connected to or driven by any shaft that is rotating the fastest.

Further, the cooling system 25 may be used with any system having a housing for which cooling is desired regardless of whether the system includes a rotating shaft. In such case, power to the centrifugal fan 26 may be provided in another manner such as with an electric drive.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context. Still further, the advantages described herein may not be applicable to all embodiments encompassed by the claims.

The invention claimed is:

1. A mechanical drive system comprising:
a mechanical drive component, the mechanical drive component having a housing and a rotatable shaft supported within the housing, the housing having a first end surface, an opposite second end surface, a pair of spaced apart side surfaces extending between the first and second end surfaces, a lower surface, and an upper surface extending between the first and second end surfaces;
an enclosure disposed on the housing, the enclosure having a first end wall, a second opposite end wall, a pair of spaced apart sidewalls extending between the first and second end walls, and an upper wall extending between the first and second end walls, one of the end walls having an output opening therein through which the rotatable shaft of the mechanical drive component extends, another of the end walls having an intake opening therein, the first and second end surfaces, the side surfaces, and the upper surface of the housing of the mechanical drive component and the walls of the enclosure defining an air passage channel in a gap between the housing and the enclosure, the air passage channel extending from the intake opening to the output opening along at least the side surfaces and the upper surface of the housing;
a plurality of heat dissipation fins, the plurality of heat dissipation fins extending from a base plate that is removably mounted on the side surfaces and the upper surface of the housing, the plurality of heat dissipation fins including fins having a flat, planar shape that are disposed in parallel to one another and in spaced relation within the air passage channel, the fins contacting the housing through the base plate and extending outwardly relative to the housing in close proximity to the enclosure, wherein the fins are clear of the housing by a distance that is at least equal to a spacing distance between adjacent fins, and wherein the fins are oriented in parallel to a direction of airflow through the enclosure; and
a centrifugal fan aligned and in fluid communication with the output opening of the enclosure, the rotatable shaft being operatively connected to the centrifugal fan, wherein the centrifugal fan is positioned external to the air passage channel, wherein, when the rotatable shaft is rotating, the centrifugal fan creates a negative pressure or vacuum adjacent the output opening so that air is drawn through input opening, through the air passage channel over and between the plurality of heat dissipation fins and between the plurality of heat dissipation fins and the enclosure, and through the output opening.

2. The system of claim 1, wherein the centrifugal fan includes an impeller.

3. The system of claim 1, wherein the heat dissipation fins are made from a material having a higher thermal conductivity than a material of the housing.

4. The system of claim 1, wherein the housing is made of a first material and the heat dissipation fins are made of a second material different from the first material.

5. The system of claim 1, wherein the output opening is a circular opening having a diameter sufficient to facilitate an airtight connection between the centrifugal fan and the one of the end walls of the enclosure.

6. The system of claim 1, wherein the enclosure substantially encloses the first end surface, the second end surface, the side surfaces and the upper surface, and wherein the enclosure exposes the housing along the lower surface.

7. The system of claim 1, wherein the enclosure is configured to enclose substantially the entire housing other than the lower surface.

8. The system of claim 1, wherein the sidewalls and the upper wall overlap with the first and second end walls.

9. The system of claim 1, wherein the enclosure is further configured to enclose substantially the housing.

10. A mechanical system comprising:
a mechanical component, the mechanical component having a housing, and first and second rotatable shafts supported within the housing, the housing having a first end surface, an opposite second end surface, a pair of spaced apart side surfaces extending between the first and second end surfaces, and an upper surface extending between the first and second end surfaces, the first shaft being operatively connected to the second shaft, the first shaft extending through the first end surface, the second shaft extending through the second end surface, and each of the side surfaces and the upper surface having a plurality of heat dissipation fins mounted thereon, wherein the plurality of heat dissipation fins includes fins extending from a base plate, the base plate being removably attached to the housing, the fins having a flat, planar shape that are disposed parallel to one another and in spaced relation, wherein the fins are oriented in parallel to a direction of airflow through the enclosure;

an enclosure disposed on and enclosing the housing, the enclosure having a first end wall, a second opposite end wall, a pair of spaced apart sidewalls extending between the first and second end walls, and an upper wall extending between the first and second end walls, the first end wall having an output opening therein through which the first shaft extends, the second end wall having an intake opening therein and through which the second shaft extends, the second end wall having a plurality of edges, each edge being adjacent one of the sidewalls and the upper wall, the intake opening being spaced from each edge of the second end wall, the first and second end surfaces, the side surfaces, and the upper surface of the housing of the mechanical drive component and the walls of the enclosure defining an air passage channel in a gap extending between the housing and the enclosure, the air passage channel extending from the intake opening to the output opening, and the plurality of heat dissipation fins being disposed within the air passage channel in contact with the housing along an inner portion of each fin in the plurality of heat dissipation fins and are clear of the enclosure along an outer portion of each fin; and a centrifugal fan aligned and in fluid communication with the output opening of the enclosure, the first shaft being operatively connected to the centrifugal fan, wherein the centrifugal fan is positioned external to the air passage channel;

wherein, when the first shaft is rotating, the centrifugal fan creates a negative pressure or vacuum adjacent the output opening so that air is drawn through input opening, through the air passage channel over and between the plurality of heat dissipation fins and also between the plurality of heat dissipation fins and the enclosure, and through the output opening.

11. The system of claim 10, wherein the housing is made of a first material and the heat dissipation fins are made of a second material different from the first material.

12. The system of claim 10, wherein the enclosure substantially encloses the first end surface, the second end surface, the side surfaces and the upper surface.

13. The system of claim 12, wherein the housing further includes a lower surface and the enclosure is configured to enclose substantially the entire housing other than the lower surface.

14. The system of claim 10, wherein the each of the first and second end walls extends to each of the sidewalls and the upper wall.

15. The system of claim 14, wherein the sidewalls and the upper wall overlap with the first and second end walls.

16. A cooling system for a mechanical drive system, the mechanical drive system having a rotatable shaft and a housing, the cooling system comprising:
an enclosure configured to be mounted on and enclose the housing, the enclosure having a first end wall, a second opposite end wall, a pair of spaced apart sidewalls extending between the first and second end walls, and an upper wall extending between the first and second end walls, one of the first and second end walls having an output opening therein, the output opening being configured to receive therethrough the rotatable shaft, and another of the first and second end walls having an intake opening therein, wherein the enclosure is further configured to provide an air passage channel extending from the intake opening to the output opening, the air passage channel defined between: the enclosure, and a first end surface, an opposite second end surface, a pair of spaced apart side surfaces extending between the first and second end surface, and an upper surface extending between the first and second end surfaces, of the housing of the mechanical drive system;

a plurality of heat dissipation fins extending from a base plate that is releasably mounted on the side surfaces and the upper surface of the housing, the plurality of heat dissipation fins including fins having a flat, planar shape that are disposed in parallel to one another and in spaced relation within the air passage channel, wherein the fins are oriented in a parallel with a direction of airflow through the enclosure and a rotation axis of the rotatable shaft, wherein the fins are clear of the enclosure by a distance that is at least equal to a spacing distance between adjacent fins; and a centrifugal fan aligned and in fluid communication with the output opening of the enclosure, wherein the centrifugal fan is configured to be: operatively connected to the rotatable shaft of the mechanical drive component, and positioned external to the air passage channel;

wherein, when the rotatable shaft is rotating, the centrifugal fan creates a negative pressure or vacuum adjacent the output opening so that air is drawn through input opening, through the air passage channel over and between the plurality of heat dissipation fins, and through the output opening.

17. The system of claim 16, wherein the another of the first and second end walls has a plurality of edges, each edge being adjacent one of the sidewalls and the upper wall, and the intake opening is spaced from each edge of the another of the first and second end walls.

18. The system of claim 16, wherein the another of the first and second end walls extends to and overlap with each of the sidewalls and the upper wall.

\* \* \* \* \*